United States Patent [19]

De Greef

[11] 4,411,366
[45] Oct. 25, 1983

[54] DEVICE FOR GRADING PRODUCTS

[75] Inventor: Jan A. De Greef, Tricht, Netherlands

[73] Assignee: De Greef's Wagen-, Carrosserie- en Machinebouw B.V., Tricht, Netherlands

[21] Appl. No.: 246,906

[22] Filed: Mar. 23, 1981

[30] Foreign Application Priority Data

Mar. 31, 1980 [NL] Netherlands ............... 8001900

[51] Int. Cl.³ ............................................ B07C 5/24
[52] U.S. Cl. ................................. 209/648; 209/646; 209/912; 209/924
[58] Field of Search ............... 209/924, 912, 646, 648, 209/592–595, 623, 659, 515

[56] References Cited

U.S. PATENT DOCUMENTS

| 1,355,999 | 10/1920 | Nelson | 209/648 |
| 1,710,199 | 4/1929 | White | 209/924 X |
| 2,442,521 | 6/1948 | White | 209/946 |
| 2,684,155 | 7/1954 | Hartrampt | 209/924 X |
| 3,770,123 | 11/1973 | Mraz | 209/912 X |
| 3,930,995 | 1/1976 | Paddock | 209/924 X |
| 4,273,649 | 6/1981 | Leverett | 209/912 X |
| 4,299,326 | 11/1981 | Ulch | 209/592 |

FOREIGN PATENT DOCUMENTS

| 930598 | 6/1955 | Fed. Rep. of Germany . |
| 1214895 | 4/1966 | Fed. Rep. of Germany . |
| 2297095 | 1/1975 | France . |
| 2380826 | 2/1977 | France . |
| 136326 | 5/1967 | Netherlands . |
| 307897 | 9/1955 | Switzerland . |

Primary Examiner—Bruce H. Stoner, Jr.
Assistant Examiner—Donald Hajec
Attorney, Agent, or Firm—Diller, Ramik & Wight

[57] ABSTRACT

In a product grading apparatus in which the articles are conveyed in trays which are allowed to tilt downwardly at a discharge station to deposit an article onto an inclined chute leading to a support underlying the path of travel of the trays, each tray is provided with a flexible strip which trails down the chute and intercepts an article discharged by a tray and gently guides it to and onto the support.

19 Claims, 10 Drawing Figures

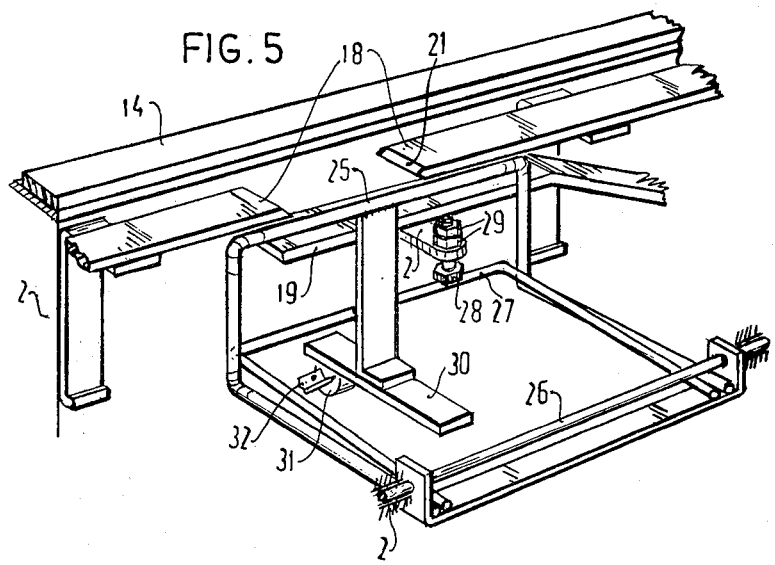
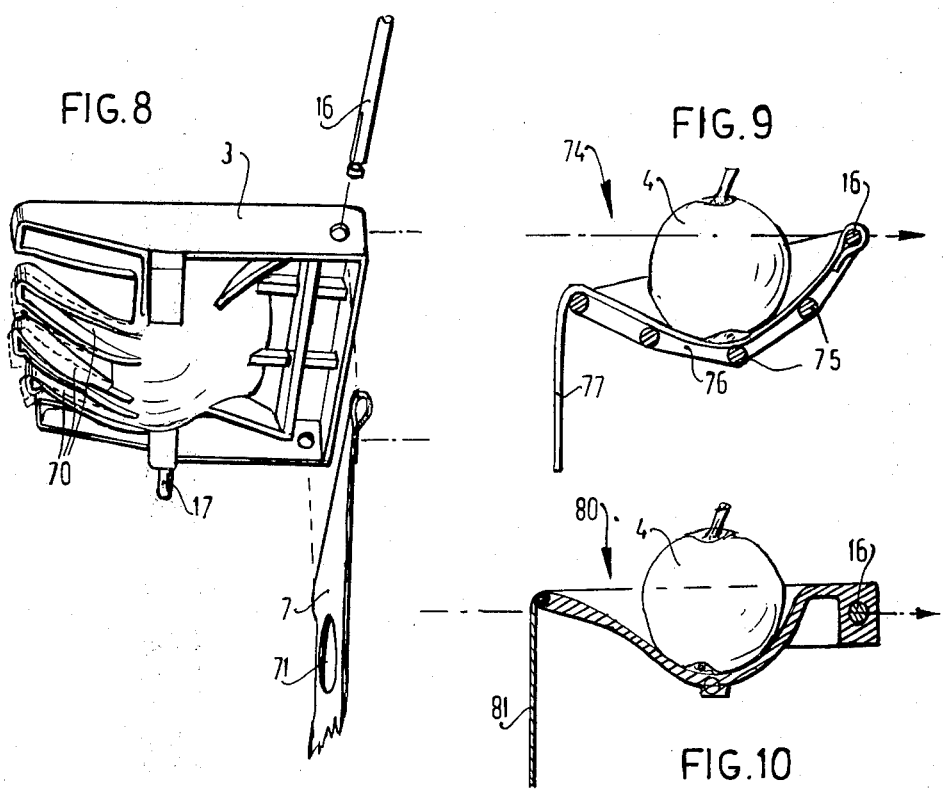

DEVICE FOR GRADING PRODUCTS

The invention relates to a device for grading products such as fruit, comprising a frame, at least one endless array of intercoupled recipients forming together a flexible member and each adapted to receive a separately supplied product and to dispense it, guide means connected with the frame and determining at least one substantially horizontal section of the flexible member, driving means engaging said member, a feeding station arranged opposite the member and co-operating herewith and comprising a product feeding device, at least two delivery stations extending beneath the horizontal section for different grades of products and control-means displacing the recipient from a carrying position into a discharging position and actuated in dependence on a product parameter determining the grade of the product for giving off the matching product to the delivery station.

Fruit and the like products may be readily damaged by hard-handed treatment, for example, it may locally become rotten-ripe. The value of damaged fruit is markedly lower than that of undamaged fruit. Consequently, handling such products has to be done with utmost care. However, this is not conducive to a fast, economic treatment of the products after harvesting. One of the processes to which harvested fruit is subjected quite likely to cause damage is the grading process.

The invention has for its object to provide a device of the kind set forth which allows rapid processing of the products by careful handling. According to the invention this is achieved by means of flexible strips moving together with the recipients and guiding the products given off by the recipients into the delivery station. In contrast to the common practice the products do not drop from the recipients, for example, onto a conveyor belt in a delivery station or onto products already present therein, but the products are, so to say, carried thereto by the strips.

When near each delivery station, beneath the horizontal section, a slide inclined downwards in the direction of movement of the recipients and co-operating with the strips is provided the products are still better guided with further reduced risk of damage into a delivery station.

In a preferred embodiment of the invention each recipient is formed by a tray connected with at least one chain and adapted to pivot about an axis in the direction of movement of the front side.

When the control-means comprise a spring-loaded weighing mechanism having a negative spring rigidity coefficient, a very short response time can be obtained so that the process can be carried out with high speed.

The products are deposited carefully one by one in the trays of the grading device, when in accordance with the invention the feeding device comprises a discs conveyor, wherein outer discs of large diameter and inner discs of small diameter form carrying elements co-operating with the trays and when the trays have fingers adapted to extend as far as between the discs.

When each tray is provided with at least one resilient capturing member, the products can be fed at a high rate to the tray in an undamaged state. Preferably, a series of resilient members is formed by fingers integrally moulded with the tray.

Further features and advantages of the invention will be apparent from the following description with reference to drawings of embodiments of the invention.

FIG. 5 is a perspective view of part of the weighing mechanism of FIG. 3.

FIG. 8 is an enlarged, perspective view of detail VIII of FIG. 1.

FIGS. 9 and 10 are each a longitudinal sectional view of alternative embodiments of detail VIII.

Figure 1:
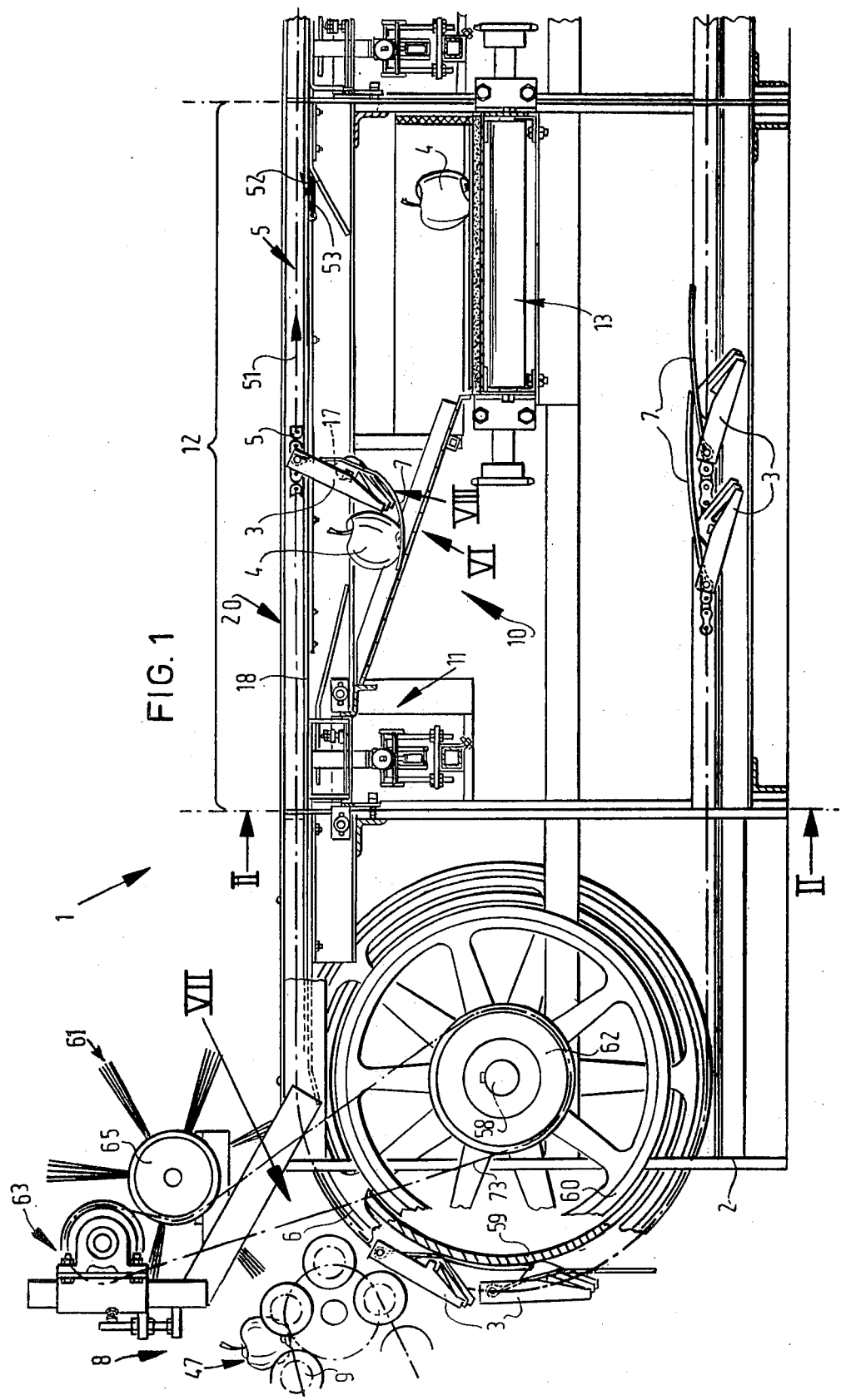
FIG. 1 is a partial longitudinal sectional view of a grading device in accordance with the invention.
Figure 2:
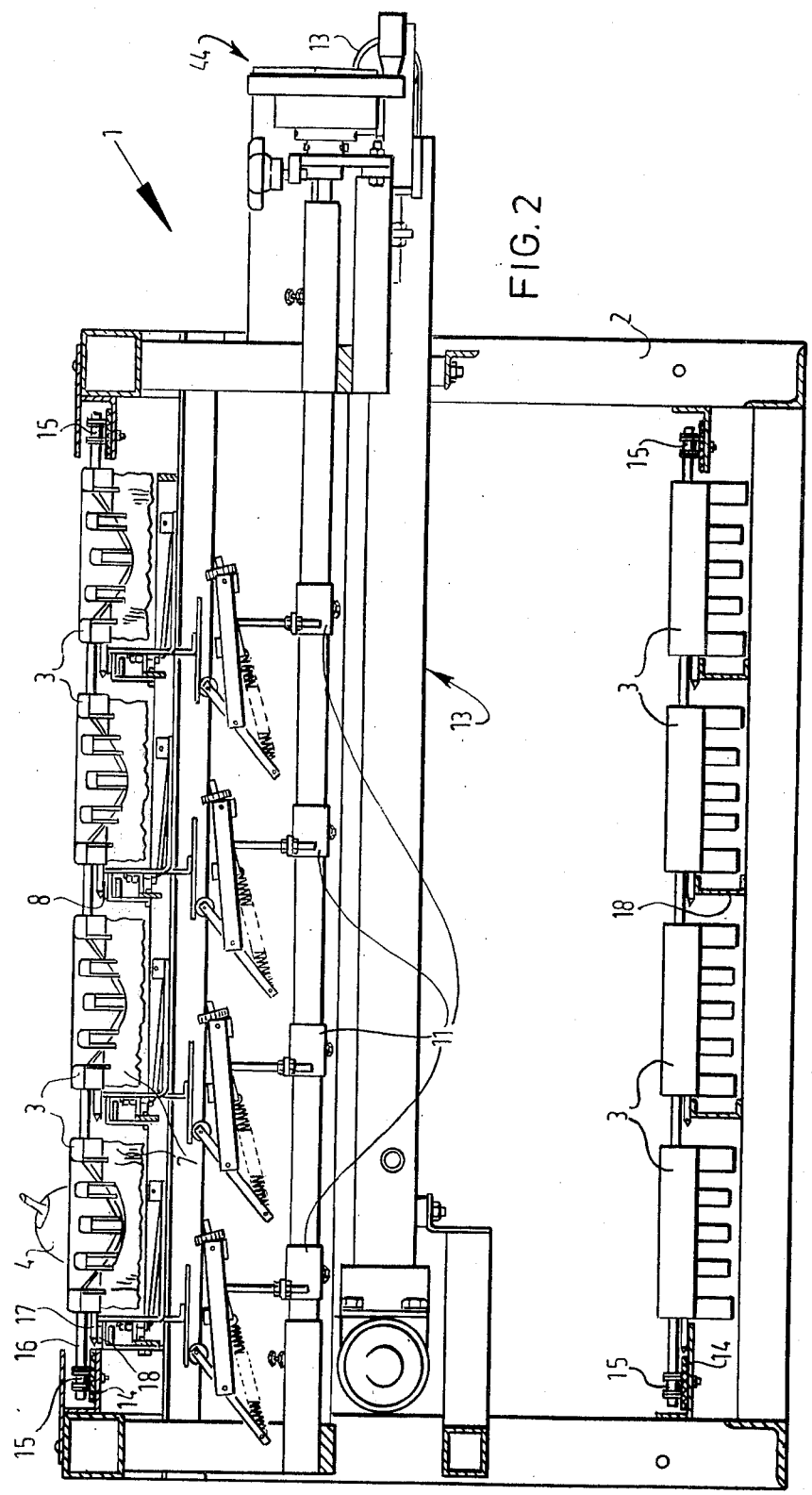
FIG. 2 is a cross-sectional view taken on the line II—II of the device of FIG. 1.

The device 1 for grading products such as fruit 4 comprises a frame 2 in which guide wheels 6 are rotatably journalled. FIG. 2 shows that the device 1 comprises four adjacent rows of recipients 3. Each group of four recipients 3 is arranged on one and the same shaft 16 between two chains 15. For guiding the chains 15 the device 1 thus comprises four guide wheels 6 in total. FIG. 1 shows only the guide wheels 6 mounted on the left-hand side of the device 1. On the right-hand side not shown are also provided guide wheels 6. The recipients 3 are arranged in contact with one another so that together with the chain 15 they constitute a flexible member 20 resembling a conveyor belt. Between the guide wheels 6 on the left-hand and right-hand sides of the device 1 a substantially horizontal section 5 of this flexible member 20 extends on the top side. By a suitable drive of the guide wheels 6 products 4 can be conveyed by the recipients 3 of FIG. 1 in the direction of the arrow 51 along the horizontal section 5. The products 4 are deposited in the recipients 3 in a feeding station 8 in a manner such that a feeding device 9 carefully deposits each product 4 in each recipient 3. The products 4 deposited in the recipients 3 at the feeding station 8 are transported along the horizontal section 5 in the direction indicated by the arrow 51. During this movement the products 4 are conducted in accordance with the value of a given product parameter to a matching delivery station 10 of the horizontal section 5. FIG. 1 shows one delivery station 10. A grading device 1 will have to comprise as many delivery stations 10 as the categories of products 4 to be sorted. In order to enable modification of the number of delivery stations 10, each delivery station 10 is preferably arranged in a delivery unit 12, the desired number of which can be arranged in the grading device 1. In each delivery station 10 a recipient 3 can be moved by actuating means 11 from a transport position into a discharging position so that the product 4 concerned is conducted away in said delivery station 10. In the device 1 of FIG. 1 the weight is the product parameter determining the class of the product 4 concerned. Therefore, the actuating means 11 comprises a weighing mechanism 24. The delivery station 10 comprises a conveyor belt 13, which can convey the products 4 given off by the recipients 3, for example, to a packing device (not shown).

Each chain 15 is supported in the horizontal section 5 by a chain guide path 14. Each recipient 3, which forms a tray as shown, is capable of pivoting about the shaft 16. In the transport position the tray 3 must remain in a horizontal position. For this purpose each tray 3 is provided with a pin 17 which slides along a recipient guide path 18 during the movement of the chains 15.

As is shown is FIG. 5 the recipient guide path 18 is discontinued at the beginning of a delivery station 10 at the area of the actuating means 11. Consequently, at this area the pin 17 of a recipient 3 does not slide along the recipient guide path 18, instead it slides along a supporting bracket 25 of a weighing mechanism 24. The supporting bracket 25 pivots about the axis of a shaft 26 journalled in the frame 2. With the supporting bracket 25 a stop bracket 27 is connected, which is urged against the head of a bolt 28. The bolt 28 is connected with the frame 2 and guarded in a given, set position by means of nuts 29. This position is such that the top side of the supporting bracket 25 is coplanar with the recipient guide path 18 so that the pin 17 of the recipient 3 smoothly moves from the recipient guide path 18 to the supporting bracket 25 and as the case may be, it can move back from the supporting bracket 25 to the recipient guide path 18. With the suporting bracket 25 a pressure plate 30 is connected, to the bottom side of which a roller 31 exerts pressure. The roller 31 is rotatably arranged in an arm 32, which is adapted to pivot in a frame 34 about a shaft 35. The end of the arm 32 remote from the shaft 35 is engaged by a tensile spring 33. The other end of the tensile spring 33 is connected with a tapped rod 36, which bears by a set nut 37 on a support 38 pivotally connected with the frame 34. By turning the set nut 37 the extent of elongation of the tensile spring 33 and hence the force exerted on the arm 32 can be adjusted. The frame 34 is mounted by means of screw threaded rods 39 and nuts 40 at a given height on a sleeve 41, which is displaceably arranged on a square tubing 43. The position of the sleeve 41 with respect to the tubing 43 can be fixed by means of a guard bolt 42.

Figure 3:
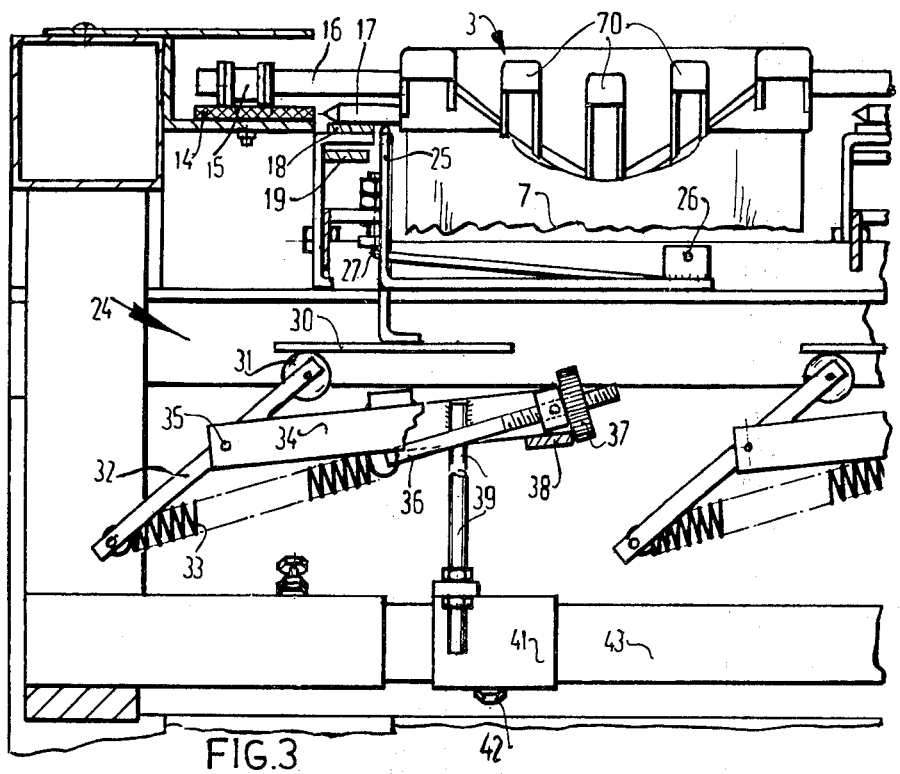
FIG. 3 is an enlarged side elevation of a weighing mechanism in accordance with the invention.
Figure 4:
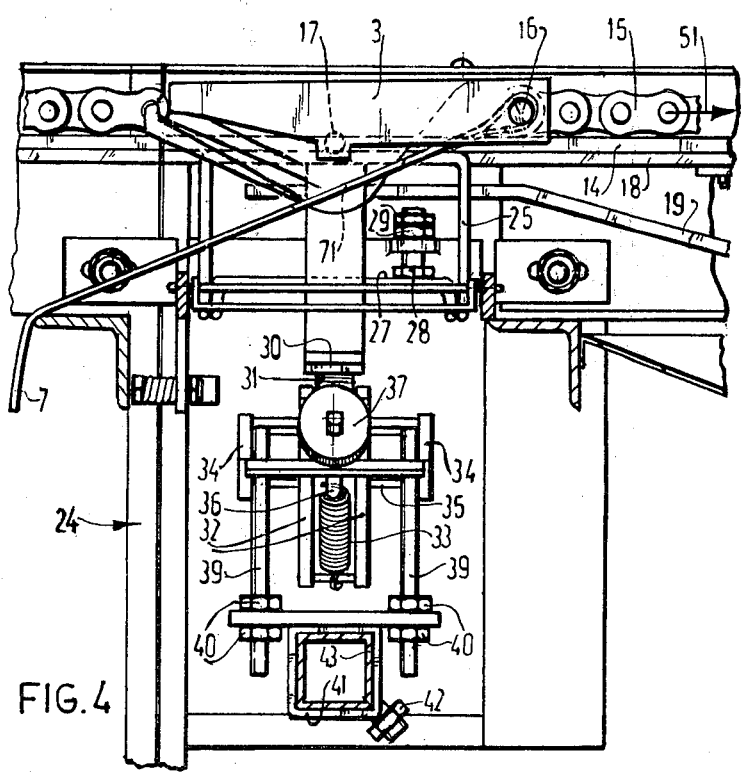
FIG. 4 is a front view of a weighing mechanism as shown in FIG. 3.

When the sleeve 41 is shifted to the right in FIG. 3 with the frame 34, the contact point of the roller 31 with the pressure plate 30 shifts to the right. Whilst the force exerted by the roller 31 on the pressure plate 30 remains the same, the force required for depressing the supporting bracket 25 is reduced because on the one hand the ratio between the distance of the contact point of the roller 31 to the pressure plate 30 and the shaft 26 and on the other hand the distance between the top side of the supporting bracket 25 and the shaft 26 becomes lower. When the force exerted by the pin 17 on the supporting bracket 25 as a result of the weight of the tray 3 with the product 4 contained therein exceeds the force resulting from the spring load, the pin 17 will push down the supporting bracket 25 so that the pin 17 comes into contact with the delivery path 19 (see FIGS. 4 and 5). During the further movement the tray 3 arrives at the delivery position. At the end of the discontinuity the recipient guide path 18 is provided with a knife edge 21 in order to prevent jamming of the pin 17.

In the embodiment of the invention the weighing mechanism 24 is dimensioned in such a way that the force exerted by the roller 31 on the pressure plate 30 is reduced when the pressure plate 30 is moved downwards. This results from the fact that the moment produced by the tensile spring 33 about the shaft 35 diminishes because the decrease of the moment resulting from the shortening of the moment arm is greater than the increase resulting from the elongation of the tensile spring 33. This has the important advantage that when the force exerted by the pin 17 on the supporting bracket 25 only slightly exceeds the adjusted value, the bracket 25 moves rapidly downwards so that the device 1 can operate at a high rate.

According to the invention all weighing mechanisms 24 associated with the same delivery station 10 are simultaneously adjusted to a desired value. This is achieved by fixing the sleeve 41 of each weighing mechanism 24 with the aid of the guard bolt 42 on a common square tubing 43. This square tubing 43 can be moved with all weighing mechanisms 24 to the right and to the left as viewed in FIG. 2. By setting once the position of the sleeves 41 on the square tubing 43 and by adjusting the tensile springs 33 by means of the set nut 37 the minimum weight of the grade of products associated with the delivery station 10 for the four weighing mechanisms 24 can be fixed by means of a known adjusting device 44 displaced in the direction of length on the square tubing 43. Together with the adjusting device 44 the square tubing 43 constitutes the common adjusting means.

Figure 6:
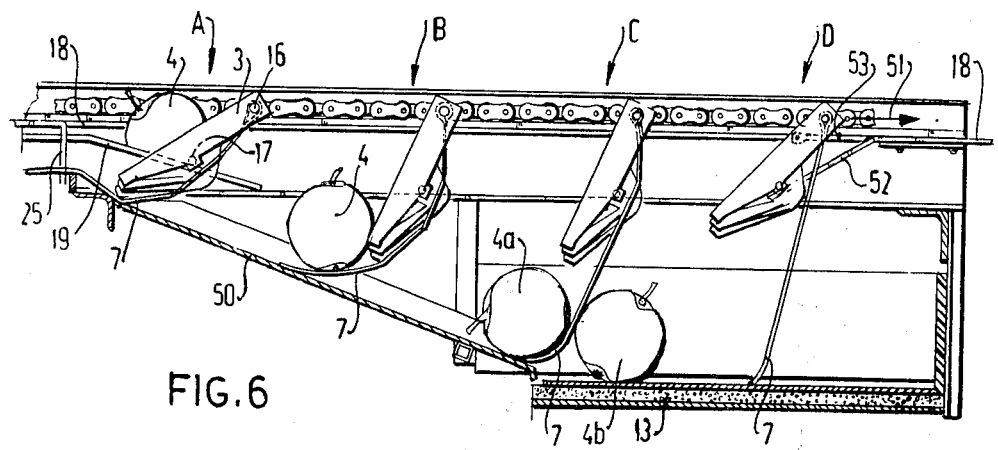
FIG. 6 shows on an enlarged scale detail VI of FIG. 1 illustrating the mode of guiding of a product by a strip in a number of positions.

According to the invention a flexible strip 7 co-operates with each tray 3 for guiding a product 4 dispensed by the recipient 3 to a delivery station 10. The strip 7 is formed by a length of slack synthetic resin foil or a rubber-coated cloth, for example, from FIG. 6 inter alia it will be apparent that in the embodiment shown a strip 7 is arranged with a loop around the shaft 16 beneath each recipient 3. When the force exerted by the pin 17 on the supporting bracket 25 as a result of the weight of the product 4 exceeds the adjusted value, the pin 17 pushes the bracket 25 downwards and reaches the delivery path 19. Subsequently during the further movement of the chain 15 to the right in the direction of the arrow 51 the recipient 3 pivots out of the horizontal transport position through the position at A into the delivery position at B. The product 4 then rolls out of the tray 3 onto the strip 7. Preferably each delivery station 10 comprises a slide 50 inclined downwards in the direction of movement of the recipients 3 and co-operating with the strips 7. If longer strips 7 are used than the strips 7 of FIG. 6, such a slide 50 is not strictly required. FIG. 6 clearly illustrates the careful way in which the strips 7 guide a product 4 along the slide 50 towards the conveyor belt 13 by which the product 4 is delivered. The strip 7 furthermore prevents the product 4a from colliding hard with the product 4b. The product 4b is carefully pushed away by the strip 7 and the product 4a comes smoothly into contact with the product 4b. After the discharge of the product 4 the pin 17 arrives at an ascending part 52 of the delivery path 19, which part guides the pin 17 back to the guide path 18 of the recipients so that the recipient 3 returns to the horizontal position. To this end the recipient guide path 18 includes a resilient or tiltable guide path part 53 above the ascending part 52, which part 53 can pass by a pin 17 from below.

Figure 7:
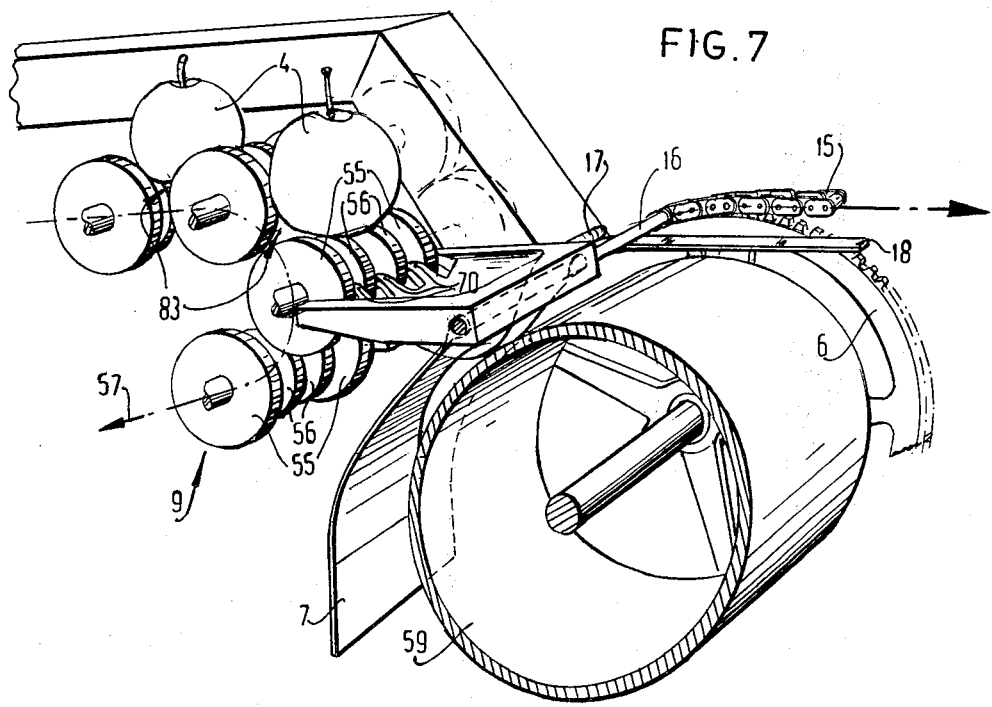
FIG. 7 is an enlarged, perspective, partial view of detail VII of FIG. 1.

The feeding station 8 (see FIG. 7) preferably comprises a discs conveyor 9 as a feeding device. The discs conveyor 9 comprises for each array of recipients 3 a series of associated discs 55, 56, in this embodiment four discs. The outer discs 55 have a larger diameter than the inner discs 56. Thus between two successive groups of four members a carrying element 83 is formed for a product 4. These known carrying elements 83 are moved along a path 57. The movement of the discs conveyor 9 comprising the carrying elements 83 is synchronized with the movement of the flexible member 20 comprising the recipients 3, since the discs conveyor 9 is driven in a manner not shown from a chain sprocket 60 arranged on the same shaft 58 as the guide wheels 6 for the chains 15. Between every two guide wheels 6 on one and the same shaft 58 a guide drum 59 for the strips 7 is arranged. The guide drum 59 ensures that the strips 7, when passing by a pair of guide wheels 6, remain well in contact one upon the other. The synchronisation of the discs conveyor 9 and the recipients 3 is such that when a product 4 is fed between two groups of four discs 55, 56, a recipient 3 is each time available for receiving the product 4. By constructing the recipient 3 as is shown in detail in FIG. 8 it is well adapted to co-operate with the discs conveyor 9. To this end the recipient 3 has fingers 70, which can extend as far as between the discs of the discs conveyor 9. Thus the product 4 only needs to move over a small distance from the discs conveyor 9 to the recipient 3. By making the recipient 3 from suitable material, preferably synthetic resin, the fingers 70 can be flexible so that the product 4 coming into contact herewith is only exposed to a slight thrust and will not be damaged. The flexible fingers 70 constitute capturing members which yield when a product is introduced into a recipient 3 (see FIG. 8).

The feeding station 8 furthermore comprises a cylindrical brush 61, the shaft 64 of which extends parallel to the shaft 58 holding the guide wheels 6. The brush 61 is driven by means of a chain drive comprising a sprocket 62 on the shaft 58, a chain 73, a sprocket 65 on the shaft 64 of the brush 61 and a chain tension device 63 with a circumferential speed equal to the speed of propagation of the recipient 3. By said brush 61 the products 4 transferred from the discs conveyor 9 to the recipients 3 are directly enclosed in said recipients 3 so that it is ensured that they will be immovable therein.

FIG. 8 furthermore shows that the strip 7 co-operating with a recipient 3 has a recess 71. The purpose of said recess 71 will be apparent from FIG. 4. As a matter of course, the strip 7 must be free of the belonging tray so as not to influence the weighing. For this reason the strip 7 is arranged around the shaft 16 of the recipient 3. The recess 71 is provided in the strip 7 to prevent the strip 7 from exerting pressure on the bottom side of the recipient 3 during the propagation of the recipients 3 and from thus affecting the measurement. From FIG. 6 it is also apparent that the stip 7 can more gently engage the bottom side of the recipient 3 thanks to the recess 71 therein.

FIG. 9 shows an alternative embodiment of a recipient 74 suitable for use with a strip 77 according to the invention. The recipient 74 has the shape of a grating comprising bars 75 interconnected by ridges 76. In this embodiment the strip 77 is located on the top side of the recipient 74 and the product 4 is lying on the strip 77 already during the transport. The control-means for moving the recipient 74 from the transport position into the discharging position have to be arranged so that the strip 77 cannot hinder the measurement of the product parameter, which means that, when the product parameter determining the product class is the weight of the product, the strip 77 has to be hanging free from the stationary device parts during the movement.

FIG. 10 shows a third embodiment of a recipient 80 according to the invention. The strip 81 is arranged at the front of the recipient 80. The strip 81 may be welded to the recipient 80 or it may be integral herewith by using an appropriate manufacturing method. The statement made with respect to the recipient 74 in connection with the measurement of the product parameter determing the product class also applies to this case.

The shape of the recipient 3 and also of the recipients 74 and 80 is such, when the control-means employed are weighing elements, that a product 4 is invariably well centered in the recipient. As a result the centre of gravity of the product 4 is invariably located substantially at the same distance from the rotary axis 16 of the recipient, which is required for correctly weighing.

Although in the foregoing description the trays are invariably represented as movable recipients, they may, as an alternative, be formed by diaphragm orifices in a grading device utilizing the diameter of the products as the product parameter determining the product class. Then the strips 7 move with the recipients and guide the product falling through the orifice.

What I claim is:

1. A device for grading products such as fruit, comprising a frame, at least one endless array of intercoupled recipients forming together a flexible member and each adapted to receive a separately supplied product and to deliver it, guide means for said member connected with the frame and determining at least one substantially horizontal section of the flexible member, driving means engaging the member, a feeding station arranged opposite the member and cooperating therewith and comprising a product feeding device, at least two delivery stations for different product classes extending beneath the horizontal section, and control means displacing the recipient from a carrying position into a discharging position in dependence on a product parameter determining the product class for discharging the matching class of product to the delivery station, a flexible strip moving together with each of the recipients due to their front edges being directly or indirectly connected to said flexible member and guiding the products discharged by the recipients into the delivery station and comprising a slide near each delivery station, beneath the horizontal section, said slide inclining downwards in the direction of movement of the recipients to cooperate with the free ends of the strips, characterized in that the control means comprise weighing means each time weighing a recipient loaded with a product, in that each recipient is a tray connected with at least one chain and adapted to pivot in the direction of movement about a transversely extending horizontal axis positioned at the front edge of the tray, and in that during each weighing operation the flexible strips are kept free from the belonging trays.

2. A device as claimed in claim 1, characterized in that the flexible strip is connected to a shaft around which the belonging tray is pivotably connected.

3. A device as claimed in claim 1, characterized in that the weighing means comprise a spring-loaded weighing mechanism having a negative spring rigidity coefficient.

4. A device as claimed in claim 1, characterized by common adjusting means for the common adjustment of a plurality of weighing mechanisms associated with one delivery station.

5. A device as claimed in claim 1, characterized in that the feeding device comprises a disc conveyor having transversely spaced discs presenting outer discs of large diameter and inner discs of smaller diameter which constitute carrying elements cooperating with the trays and in that the trays have fingers adapted to extend between the discs.

6. A device as claimed in claim 1, characterized in that each tray is provided with at least one resilient capturing member.

7. A device as claimed in claim 6, characterized in that the resilient capturing member is formed by a finger moulded integrally with the tray.

8. A device as claimed in claim 1, characterized in that the flexible strip has a recess leaving the tray free in the carrying position, said recess receiving the bottom of the tray, when the product rolls from the downwardly pivoted tray over the free end of the tray onto the belonging flexible strip.

9. A device for grading products such as fruit, comprising a frame, at least one endless array of intercoupled recipients forming together a flexible member and each adapted to receive a separately supplied product and to deliver it, stationary guide means for said member connected with the frame and determining at least one substantially horizontal section of the flexible member, driving means engaging the member, a feeding station arranged opposite the member and cooperating therewith and comprising a product feeding device, at least two stationary delivery stations for different product classes extending beneath the horizontal section and control means displacing the recipient from a carrying position into a discharging position in dependence on a product parameter determining the product class for discharging the matching class of product to the delivery station, a flexible strip moving together with each of the recipients due to their front edges being directly or indirectly connected to said flexible member and guiding the products discharged by the recipients into the delivery station and comprising a stationary slide near each delivery station, beneath the horizontal section, said slide inclining downwards in the direction of movement of the recipients to cooperate with the free ends of the strips, characterized in that the control means comprise weighing means each time weighing a recipient loaded with a product, in that each recipient is a tray connected with at least one chain and adapted to pivot in the direction of movement about a transversely extending horizontal axis positioned at the front edge of the tray, and in that during each weighing operation the flexible strips supported by the belonging trays are kept free from the stationary device parts.

10. A device as claimed in claim 9 characterized in that the flexible strips are hanging downwards from the free ends of the trays and are brought in cooperating engagement with the slide of a delivery station by downward swinging movement of the belonging trays.

11. A device as claimed in claim 9, characterized in that the flexible strip is connected to a shaft around which the belonging tray is pivotably connected.

12. A device as claimed in claim 9, characterized in that the weighing means comprise a spring-loaded weighing mechanism having a negative spring rigidity coefficient.

13. A device as claimed in claim 9, characterized by common adjusting means for the common adjustment of a plurality of weighing mechanisms associated with one delivery station.

14. In a machine for conveying discrete objects and discharging them to a selected station, of the type having an endless conveyor means for receiving the discrete objects and traveling them along a horizontal path which overlies a plurality of discharge stations, said endless conveyor means comprising a series of receptacles pivotally connected at their forward ends to allow their trailing ends to swing downwardly to discharge position at a selected one of said discharge stations, the improvement which comprises:

a downwardly inclined slide underlying said path at an upstream position relative to and leading to each discharge station;

each discharge station presenting a support disposed a predetermined distance below said path; and each receptacle having a flexible strip which trials the receptacle as it is moved horizontally along said path and each said strip having a trailing length such that it reaches to the support at a discharge station when its associated receptacle is allowed to tilt downwardly thereat, whereby the strip is still constrained to trail the receptacle so as to control the downward tilting of each receptacle and form a cushion on the associated slide for an object being discharged, which cushion trails the receptacle, down the slide, and remains in place until the object reaches the associated support, thereby to control the progress of the object down the slide even after it has left the confines of the associated receptacle.

15. In the machine as defined in claim 14 including means upstream of each said discharge station for allowing discharge movement of only those receptacles bearing objects of a particular weight, whereby the discharge stations receive objects graded by weight.

16. In the machine as defined in claim 15 wherein each strip is connected to the pivot for its associated receptacle and extends therefrom below such associated receptacle.

17. In the machine as defined in claim 15 wherein said strip is connected to the pivot for its associated receptacle and extends therefrom above such associated receptacle.

18. In the machine as defined in claim 15 wherein each strip is attached to the trailing end of its associated receptacle.

19. In a machine for conveying discrete objects and discharging them to a selected station, of the type having an endless conveyor means for receiving the discrete objects and traveling them along a horizontal path which overlies a plurality of discharge stations, said endless conveyor means comprising a series of receptacles pivotally connected at their forward ends to allow their trailing ends to swing downwardly to discharge position at a selected one of said discharge stations, the improvement which comprises:

a downwardly inclined slide underlying said path at an upstream position relative to and leading to each discharge station;

each discharge station presenting a support disposed a predetermined distance below said path; and means for controlling downward tilting of each receptacle to gently discharge an object and cushion it on a slide and for thereafter controlling the progress of the cushioned object down the slide generally in accord with continued movement of the receptacle until an object reaches and is deposited gently on the support of the discharge station, said means comprising a flexible strip which moves with each receptacle in trailing relation thereto and which is of a length to reach the support when its associated receptacle is above such support.

* * * * *